United States Patent

Tadic et al.

Patent Number: 5,822,861
Date of Patent: Oct. 20, 1998

[54] METHOD OF MANUFACTURING A ROLLER BEARING

[75] Inventors: Vendran Andelo Tadic, Elst; Johan Christian Marinus Bras, Tricht, both of Netherlands; Leslie Berryman, Bridgnorth, England

[73] Assignee: SKF Industrial Trading & Development Company B.V., Mt. Nieuwegein, Netherlands

[21] Appl. No.: 297,672

[22] Filed: Aug. 29, 1994

[30] Foreign Application Priority Data

Sep. 16, 1993 [NL] Netherlands ............................ 9301602

[51] Int. Cl.⁶ ...................................................... F16C 33/32
[52] U.S. Cl. .................... 29/898.064; 264/242; 264/236; 264/347; 384/527
[58] Field of Search ..................................... 384/527, 531, 384/576; 264/242, 488, 485, 494, 236, 347, DIG. 18; 29/898.064, 898.065, 898.067; 156/307.1

[56] References Cited

U.S. PATENT DOCUMENTS

| 4,126,362 | 11/1978 | Hamblin et al. ........................ 384/527 |
| 4,203,815 | 5/1980 | Noda et al. ............................ 204/159.2 |
| 4,264,490 | 4/1981 | Berejka .................................... 264/485 |
| 4,278,307 | 7/1981 | Olschewski et al. ................... 384/527 |
| 4,296,582 | 10/1981 | Simpson et al. . |
| 4,367,185 | 1/1983 | Nojiri et al. ............................. 264/488 |
| 4,781,877 | 11/1988 | Rabe ........................................ 264/242 |
| 4,858,293 | 8/1989 | Rosenweig .......................... 29/148.4 A |
| 5,067,826 | 11/1991 | Lemelson ................................. 384/492 |
| 5,284,394 | 2/1994 | Lemelson ................................. 384/463 |
| 5,539,844 | 7/1996 | Tazumi et al. ........................... 384/531 |

FOREIGN PATENT DOCUMENTS

| 0394587 | 10/1990 | European Pat. Off. . |
| 2654931 | 6/1977 | Germany . |
| 4041068 | 1/1992 | Germany . |
| 60-161119 | 8/1985 | Japan . |
| 2217395 | 10/1989 | United Kingdom . |

*Primary Examiner*—Larry I. Schwartz
*Assistant Examiner*—Marc W. Butler
*Attorney, Agent, or Firm*—Daniel J. Hulseberg; Mayer Brown & Platt

[57] ABSTRACT

The invention relates to a method of manufacturing a roller bearing comprising a cage made from a thermoplastic polymer-containing material. By cross-linking the polymeric material its properties, such as form retention and compatibility with lubricants, are improved. A roller bearing provided with a cage made from suitably cross-linked thermoplastic polymer-containing material can be used even at temperatures above the melting point of the polymer. According to the invention a roller bearing is manufactured by forming a cage from thermoplastic polymer-containing material, providing it with rotating bodies and only then cross-linking the material. This avoids damage to an otherwise already rigid cage during the insertion of the rotating bodies.

3 Claims, 1 Drawing Sheet

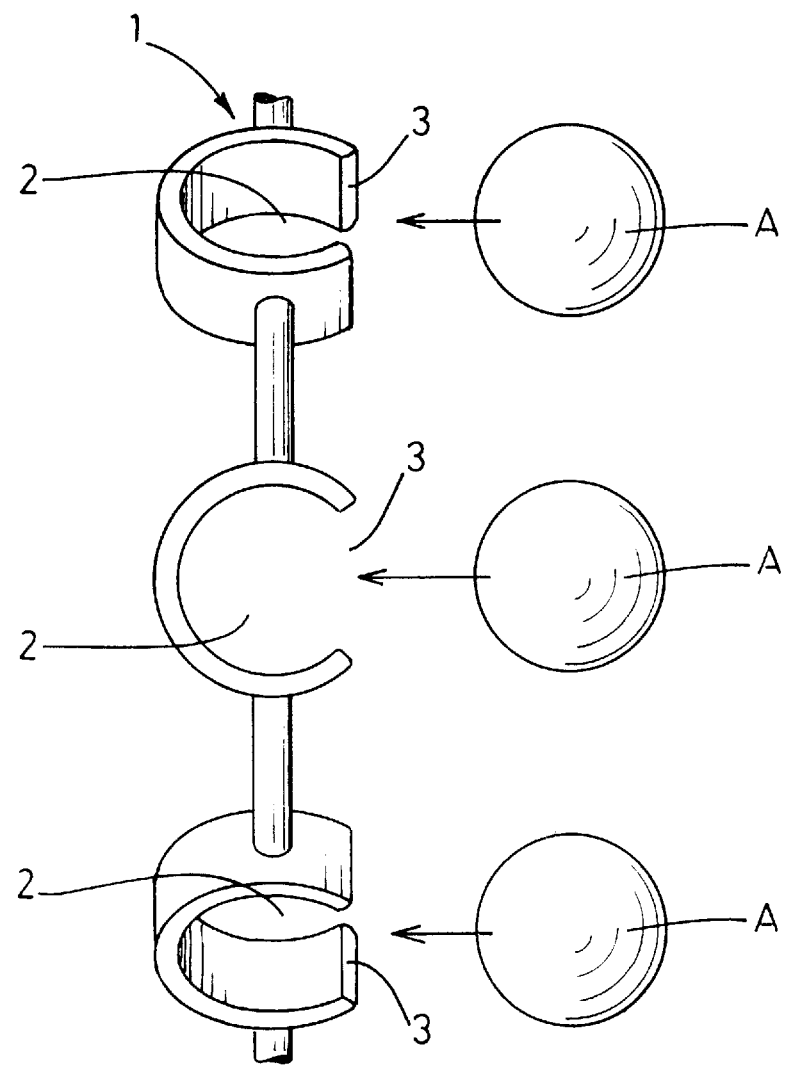

METHOD OF MANUFACTURING A ROLLER BEARING

The invention relates to a method of manufacturing a roller bearing, which roller bearing is provided with a cage, whereby the cage over its annular circumference comprises receiving means for rotating bodies, and is formed from crosslinked polymer-containing material, and rotating bodies.

Such a method is known from DE 40 41 068. This publication discloses a method of manufacturing a bearing provided with a plastic cage comprising a cross-linked polyphenylene sulphide resin. The plastic is sufficiently flexible to allow the incorporation of rotating bodies.

The cages manufactured according to this method have the disadvantage that under a heavy load the cage looses its rigidity, form and functionality. This may cause damage or destruction of the roller bearing and may in some applications lead to dangerous situations. Moreover the polymer-containing material used is relatively expensive.

The present invention aims at improving a method of the manufacture of bearings comprising cages from cross-linked polymer-containing material, whereby the above-mentioned problems are effectively eliminated.

To this end the method according to the invention is characterized in that first a cage is formed from cross-linkable, thermoplastic polymer-containing material, that it is then provided with rotating bodies and that the material is subsequently cross-linked under the influence of radiation and the cross-linked material-containing cage, thus provided with rotating bodies, is assembled into a roller bearing in a manner which is in itself known.

This method is particularly useful when applying a cage having receiving means for rotating bodies whereby the openings of the receiving means is smaller than the diameter of the rotating bodies. The cage of which the material is not yet cross-linked and which is still somewhat flexible can, because of its flexibility be provided with rotating bodies without being damaged, which is good for the operational life and allows operation under heavy loads.

The radiation is preferably ionizing radiation, especially β-radiation.

In this way the intended cross-linking is effectively brought about. β-radiation possesses sufficient penetration and is radiation technically easy to handle.

The invention will be further elucidated with the aid of the drawing which shows an example of an embodiment of a cage for a roller bearing according to the invention and in which the only Figure shows a radial view of the cage for a roller bearing.

The figure shows part of a cage 1 which over its circumference is provided with receiving means 2. The cage is formed from a material containing a thermoplastic synthetic material which is subsequently cross-linked. The synthetic material may be one of the common nylons or polyether ether ketones. However, the invention allows the use of a great variety of cheap plastics such as polypropylene, mixed polypropylenes and polyurethanes.

The receiving means 2 shown here have an opening 3 which is smaller than the diameter of the rotating bodies A to be placed into the receiving means 2, so that the rotating bodies A are retained in the receiving means. The rotating bodies A consist of balls, but can for instance also comprise rollers. According to a preferred embodiment the cage 1 is provided with the rotating bodies A before the polymer-containing material is cross-linked. This prevents that a cage, which in order to function properly is rigid and as mentioned before is provided with receiving means 1 having openings 2 which are smaller than the diameter of the rotating bodies A, incurs damages during insertion of the same, in the form of, for instance haircracks.

In order to improve the flexibility the polymeric material can contain additives such as a plasticizer. De plasticizer is also cross-linked under the influence of radiation.

The polymeric material can also be provided with additives that promote cross-linking. If the polymer that is used is difficult to cross-link, such as polyamide, the application of such additives is very advantageous. Examples of cross-linking promoters are easily cross-linkable polymers such as polyethylene. Applying cross-linking promoters can at the same time improve the efficiency of the radiation sources, so that radiation sources can be used which would otherwise be less suitable.

The degree of cross-linking is adapted to the desired properties. A higher degree of cross-linking results in a less elastic and harder cage.

To influence the properties of the cage, additives such as fibre, in particular glass fibre and carbon fibre, can be incorporated in the polymeric material.

What is claimed is:

1. A method of manufacturing a roller bearing comprising the steps of:

forming a cage from cross-linkable, thermoplastic polymer-containing material, said cage having an annular circumference and means for receiving and holding rotating bodies over the entire annular circumference thereof;

inserting into the cage rotating bodies to form a cage containing rotating bodies;

subjecting the cage containing the rotating bodies to radiation to effect cross-linking of the cage material without bonding the rotating bodies thereto; and assembling the cross-linked cage and rotating bodies into a roller bearing.

2. A method according to claim 1, characterized in that the radiation is ionizing radiation.

3. A method according to claim 2, characterized in that the ionizing radiation is β-radiation.

* * * * *